United States Patent [19]

Zimmerman

[11] Patent Number: 5,501,562
[45] Date of Patent: Mar. 26, 1996

[54] HAY BALE STACKER

[76] Inventor: Lawrence Zimmerman, 1156 180th Ave., New Richmond, Wis. 54017

[21] Appl. No.: 405,743

[22] Filed: Mar. 20, 1995

[51] Int. Cl.[6] .................................................. B65G 57/32
[52] U.S. Cl. ...................... 414/111; 414/24.5; 414/789.7; 414/794
[58] Field of Search ................................ 414/24.5, 111, 414/444, 789.7, 791.5, 794, 794.2, 901

[56] References Cited

U.S. PATENT DOCUMENTS

| | | | |
|---|---|---|---|
| 3,223,253 | 12/1965 | Garbe et al. | |
| 3,370,719 | 2/1968 | Oler | 414/789.7 |
| 4,006,830 | 2/1977 | Knaggs | 414/789.7 |
| 4,289,436 | 9/1981 | Zipser et al. | 414/791.6 |
| 4,295,772 | 10/1981 | Zimmerman | |
| 4,359,306 | 11/1982 | Zimmerman | |
| 4,710,087 | 12/1987 | Naaktgeboren | 414/111 |
| 5,018,924 | 5/1991 | Palmer | 414/24.5 |

FOREIGN PATENT DOCUMENTS 217382  9/1958  Australia .

Primary Examiner—David A. Bucci
Assistant Examiner—Douglas A. Hess
Attorney, Agent, or Firm—Ryan, Maki & Hohenfeldt

[57] ABSTRACT

A machine for stacking hay bales emerging from a hay baler in pyramidal stacks of six bales, has a supporting bed for receiving bales from a drop table. The bed is provided with a side panel and a pair of separator panels for separating rows of bales in the stack, the dividers being tiltable for orienting the bales into a pyramidal stack. The machine is mounted on wheels for towing, with the bed being pivotable from a substantially level position wherein the bales are collected, to a rearwardly dropped position for discharge of the bales onto a field in a pyramidal stack. Improved discharge of pyramidal stacks is achieved by orienting the separator panels at an oblique angle relative to the line of travel of the machine whereby slippage of the bales from between the panels is facilitated.

5 Claims, 9 Drawing Sheets

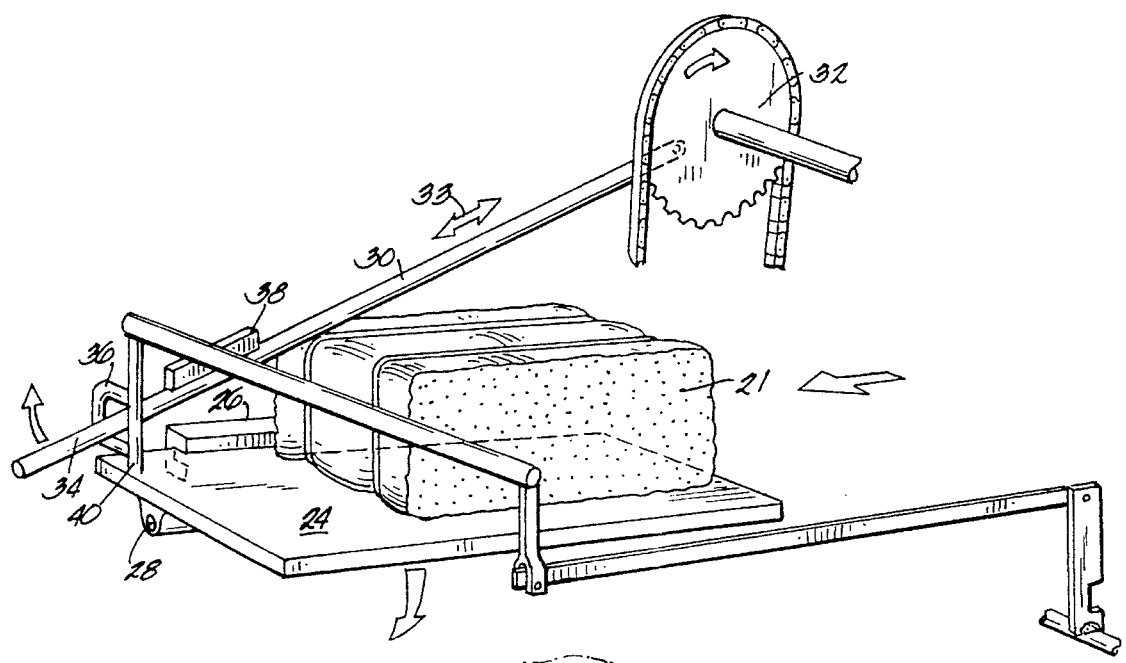
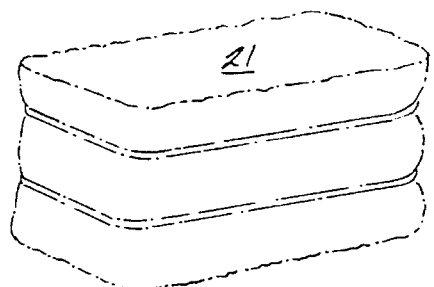
Fig. 2.
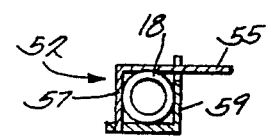
Fig. 8A
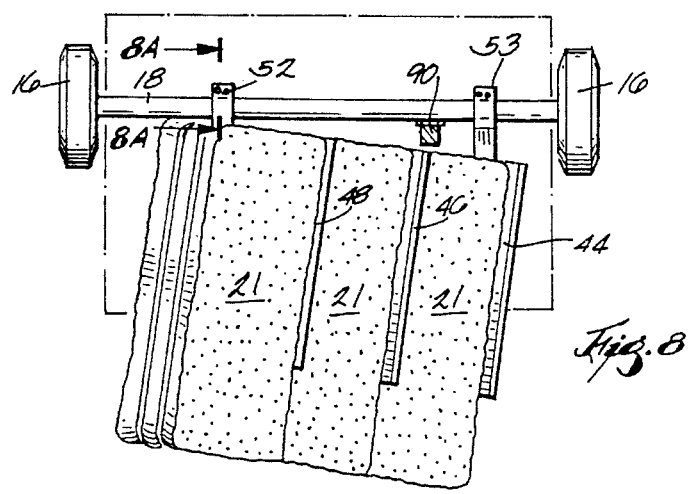
Fig. 8

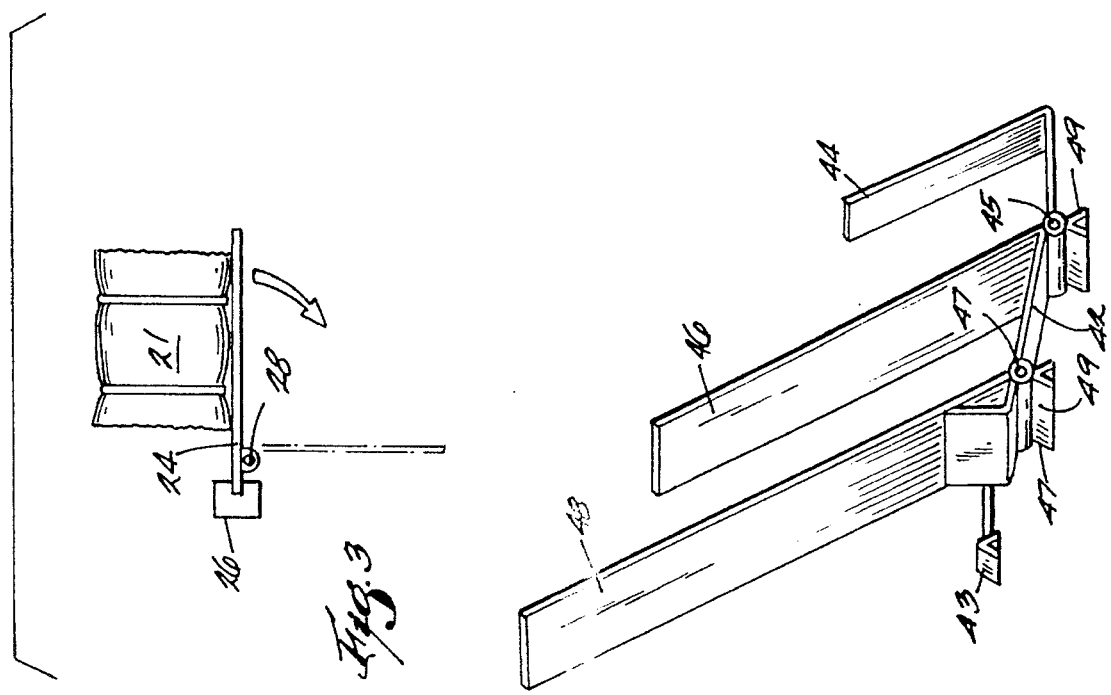

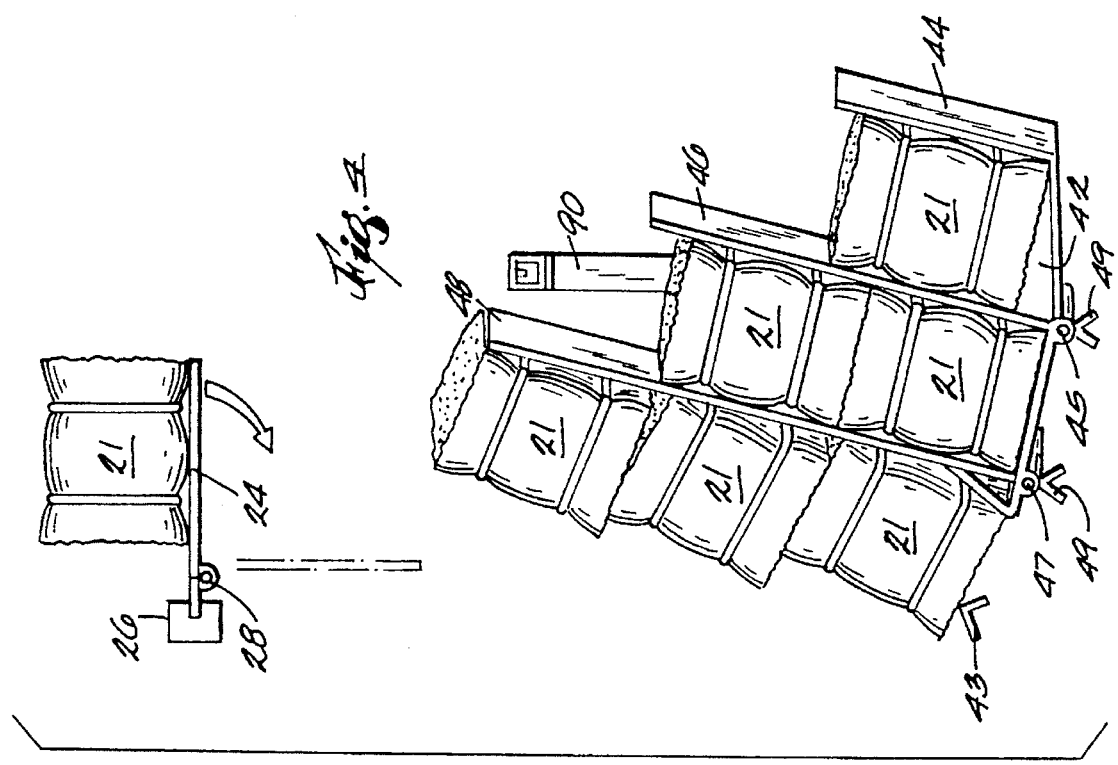

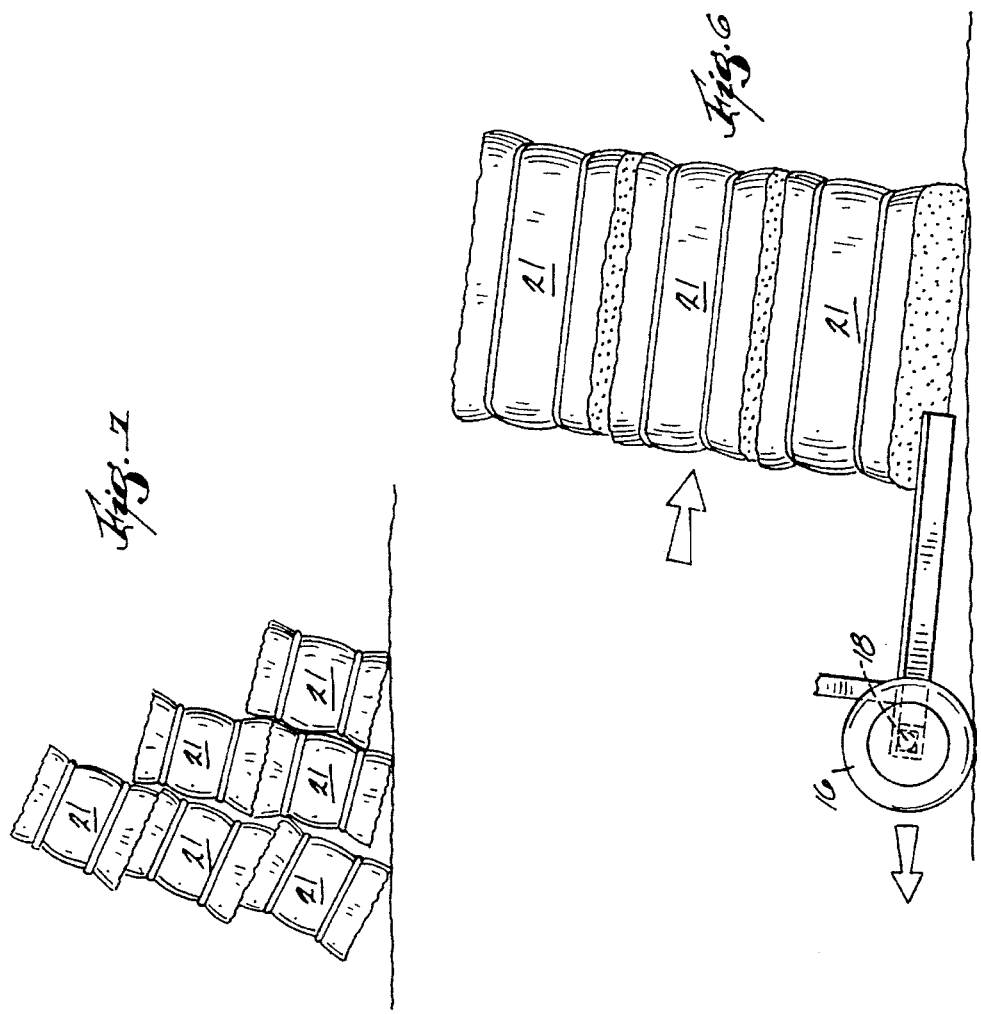
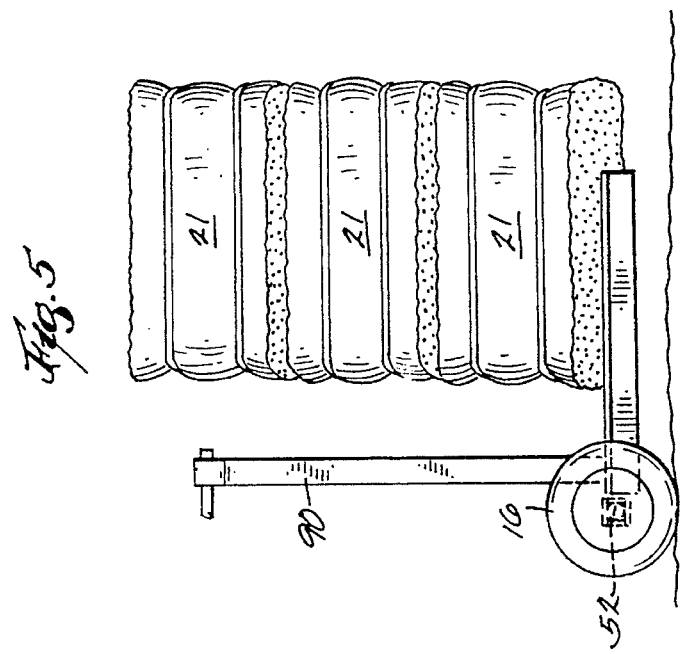

HAY BALE STACKER

This invention relates to hay bale stacking equipment and more particularly to a improvements to a device that is towed behind a hay baler for the purpose of stacking hay bales into small stacks and depositing them in the field for further curing of hay.

BACKGROUND OF THE INVENTION

In my earlier U.S. Pat. Nos. 4,359,306 issued Nov. 16, 1982 and 4,295,772 issued Oct. 20, 1981 I described devices for forming pyramidal shocks of hay bales. Those devices require a bale stacker who rides on the skid described therein and manually stacks the bales in the device.

I have subsequently demonstrated equipment which automatically stacks bales emerging from a hay baler behind which the automatic stacker device is towed. The present invention relates to improvements and refinements of such devices.

My previous devices, which automatically formed stacks of six bales each, included a ramp for successively elevating bales to a drop table located at the rear of the device. A trip was provided for successively allowing the tripping of the drop table and allowing the bales to be collected on a collecting bed located below the drop table. The bales are, as they fall, rotate 90° about their longitudinal axis so that they are dropped on their edges with the twine oriented laterally around the bale, and thus, with a cut edge at the bottom facing the ground. The machine was also provided with separator panels that are pivotally attached to the collecting bed so that as the successive bales fall they are automatically orientated in a six bale stack similar to those shown in my above-referenced, '306 patent. The bale collecting bed on the device is maintained in a horizontal position until six bales have been collected into a pyramidal stack or shock. A mechanism then trips the bed support allowing the rear of the bed to pivot downwardly toward the ground. The bales, which have a greater length than the bed and the separator panels contained thereon, then contact the ground, and the separator panels and bed are pulled away from the stack, which then remains standing in the field for further curing of the hay contained in the bales.

The foregoing devices operated satisfactorily when dry hay was being processed. However difficulties emerged in the functioning of the machine when hay having a relatively high moisture content was baled. A need therefore has existed for improvements of a hay bale stacking device so that it will operate consistently and efficiently regardless of hay moisture content or field conditions.

SUMMARY OF THE INVENTION

It is a principal object of the present invention to provide improvements and refinements to an automatic hale bale stacking device so that high moisture hay can be processed thereby. In accordance with an important aspect of the invention a bale-collecting bed and divider system is provided which enables the stack of bales to be deposited in the field and the stacking device pulled away therefrom consistently without disturbing the bale stack or causing it to collapse. In accordance with another aspect of the invention these results are achieved by orienting the divider plates and the bale supporting bed at an oblique angle relative to the direction of travel of the bale stacking device.

In accordance with another aspect of the invention a bale stacking device is provided having an improved trip mechanism that is activated by the bales themselves and controls the functioning of the drop table and other motions required during operation of the automatic stacking machine.

In accordance with yet another aspect of the invention a modification of the bale-collecting separator panels enables formation of stacks or shocks in which air flow channels are provided that enable improved drying of the hay in the stacks.

Briefly, in accordance with the invention a machine for stacking hay bales emerging from a hay baler in pyramidal stacks of six bales, has a supporting bed for receiving bales from a drop table. The bed is provided with a side panel and a pair of separator panels for separating rows of bales in the stack, the dividers being tiltable for orienting the bales into a pyramidal stack. The machine is mounted on wheels for towing, with the bed being pivotable from a substantially level position wherein the bales are collected, to a rearwardly dropped position for discharge of the bales onto a field in a pyramidal stack. Improved discharge of pyramidal stacks is achieved by orienting the separator panels at an oblique angle relative to the line of travel of the machine whereby slippage of the bales from between the panels is facilitated.

Further advantages and objects of the invention will be apparent from the accompanying description, claims and drawings.

BRIEF DESCRIPTION OF DRAWINGS

FIG. 2 is a perspective view of the hay bale drop table subassembly of the machine of FIG. 1;

FIG. 3 is a perspective view partially diagrammatic showing dropping of a bale from the drop table subassembly to a supporting bed for formation of bales into a stack;

FIG. 4 is a view of the components of FIG. 3 shown after six bales have been received on the supporting bed;

FIG. 5 is a side view illustrating the supporting bed in conjunction with a stack of bales supported in the transport position;

FIG. 6 is a view similar to FIG. 5 showing the supporting bed in the dropped position for depositing of a stack of bales in a field;

FIG. 7 is an end view showing the stack of bales after the machine has been withdrawn therefrom;

FIG. 8 is a top view showing the relationship between the supporting bed and the axle assembly of the machine of this invention;

FIG. 8A is a sectional view taken along Line 8A—8A of FIG. 8;

DETAILED DESCRIPTION OF PREFERRED EMBODIMENTS

Figure 1:
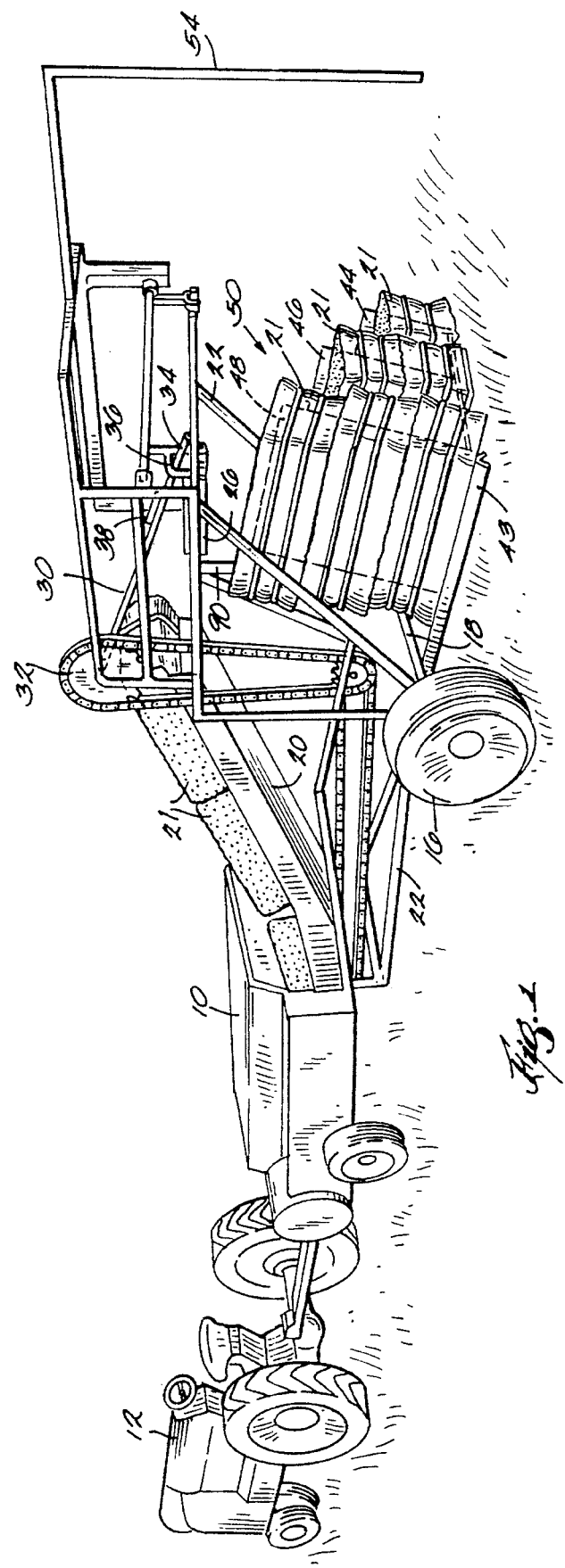
FIG. 1 is a prospective view of the machine of the present invention being towed behind a hay baler which is in turn towed behind a tractor.

Referring more specifically to the drawings there is seen in FIG. 1 a hay baler 10 of conventional design towed behind a tractor 12. An attachment 14 of this device is connected to and towed by baler 10.

Bale stacking device 14 is towed over the field on wheels 16 which are connected in conventional fashion at opposite ends of axle 18. Machine 14 takes its form by virtue of numerous frame members 22 which can be configured as desired in order to support the working components of the machine.

As seen in FIG. 1 hay bales 21 emerging from baler 10 successively push each other up the incline of chute 20 and onto a drop table 24. Drop table 24 is pivotally connected to frame 20 and is provided with a counterweight 26 which causes the table 24 to be maintained in the horizontal position seen in FIGS. 1–4. The weight of a bale 21 overcomes the force of counterweight 26 allowing table 24 to drop each successive bale 21 when table 24 is unlatched. Table 24 is attached to one or more of the cross frame members 22 by means of a pivot shaft 28.

Referring specifically to FIG. 2 the latch and trip mechanism for pivoting drop table 24 is illustrated. A reciprocating arm 30 is attached to a driven wheel 32 to cause reciprocation of arm 30 in an axial direction as indicated by arrows 33. Arm 30 is pivotally attached to wheel 32 so that its free end can be raised by bale 21 when the bale is entirely positioned on and supported by table 24. The free end of 34 of arm 30 is fitted through a loop 36. The upper surface of arm 30 is provided with a projection 38 which forms a cam surface adapted to strike the loop 36 when arm 30 is raised. Loop 36 is attached to the side of a vertical arm 40 which is positioned on the edge of table 24. When the platform is in the raised position the bottom of arm 40 acts as a latch to retain the table 24 in the horizontal position thereby enabling it to support a bale 21. When arm 30 is raised by bale 21 and loop 36 is struck by cam 38 and the lower end of vertical rod 40 is caused to move off of the edge of table 24. Table 24 is then free to pivot downwardly thus discharging bale 21 and causing it to rotate 90°.

Bale stack collecting bed 42 is provided with a side plate 44 and bale divider panels 46 and 48. Panels 46 and 48 are pivotally connected to bed 42 by hinges 45 and 47, respectively. It is preferred to support each of these hinges on an angle iron 49 in order to assure stability of the bed assembly.

As best seen in FIG. 3 the first bale 21 is collected on bed 42 with separator panels 46 and 48 pivoted to the left. This enables placement on bed 42 of the first bale. The mechanism for pivoting of separator plates 44, 46 and 48 as well as raising and lowering of bed 40 to which is pivotal about axel 18 is not shown herein in detail as the mechanisms are identical to those utilized in my aforementioned previously manufactured machines of the same type. After the first bale has been collected on bed 42 the mechanism (not shown) allows separator panel 46 to pivot to the right as seen in FIG. 4. Two more bales are then collected and panel 48 is subsequently pivoted to the right in order to receive the remaining three bales of the stack on bale supporting arm 43.

It will be noted that after each of the bales has been rotated 90° from the initial position that is assumed on drop table 24 that each bale is now oriented with a cut side down. This orientation is believed to optimize the curing conditions of the hay.

It will be noted that divider panel 48 is provided with a lower end 49 that is angled away from the panels 44 and 46. This assures a separation between the lowermost bale supported against panel 48 and the adjoining lowermost bale between panels 46 and 48. As a result the hay bale stack assumes a configuration shown in FIG. 7 wherein air circulation spaces are provided between the rows of bales. Such circulation has been found to be instrumental in providing well cured and nutritious hay even though the hay is baled in a very moist or even freshly cut condition.

After six bales have been collected as seen in FIGS. 4 and 5 the timing mechanism provided on machine 14 causes, through appropriate linkage, the supporting bed 42 to pivot downwardly as seen in FIG. 6. Since the baler and stacking machine 14 are moving forward the stack of bales 15 becomes deposited in a weather-resistant stack in the field as seen in FIG. 7. Since bed 42 is substantially shorter than the length of bales 21 the bales contact the ground while bed 42, arm 43 and panel 44. 46 and 48 are pulled away from the stack of bales 50.

In accordance with the present invention the difficulty which previously occurred of withdrawing bed 42, arm 43 and separator panels 44, 46 and 48 away from the stack of bales 50 is overcome by orienting bed 42 so that arm 43 and the divider panels 44, 46 and 48 are positioned at an oblique angle relative to the line of travel of machine 10. As best seen in FIG. 8 this causes the stack of bales to be dropped at an oblique angle (preferably in the range of 2° to 10°) relative to the line of travel of machine 14. The positioning of stack 50 at this oblique angle has the advantage that the separator panels 44, 46 and 48 appear to be pulled away from the surfaces of bales 21 and do not cause the bales to be wedged or dragged along behind the machine. Thus, unlike earlier machines which tended to tip the bales over, the bales remain standing in a water and weather resistant stack 50 as shown herein. As in the case of my earlier machines bed 42 is raised back to the horizontal position by appropriate counterweights and springs and, preferably, a lever arm 90, all of which assist in raising bed 42 to a horizontal position where it is latched by means of appropriate latching devices (not shown). Since these features have been previously employed and can be formed in various versions and modifications by those skilled in the art, they are not shown in detail herein.

Pivoting of bed 42 an its divider panels at an oblique angle relative to the line of travel of machine 10 can be accomplished in various ways. In the preferred embodiment illustrated, hinges 52 and 53 engage axle 18 at different distances from the front of bed 42. Preferably right hand hinge 53 is of a length greater than left hand hinge 52. The bed 42 and divider panels 44, 46, 48 will then all be positioned at an oblique angle relative to the line of travel of machine 10 as well as to axle 18. A similar effect is produced by angling wheels 16 relative to axle 18 so that machine 10 is always tending to steer to the left. This method is, however, less preferred for machines intended to be towed on roadways than the alternative shown in the drawings.

As best seen in FIG. 8A, hinge 52 is either connected to the forward end of bed 42 or to an extension 55 thereof. Hinges 52 and 53 are preferably formed from an angle iron 57 which engages the top and front of axle 18. Straps or bolts 59 secure the hinge around axle 18.

In order to assure that the machine 14 has moved forward enough to clear the stack of bales 50 a sensing device 54 is provided overhanging the rear of the machine as seen in FIG. 1. After the sensor 54 rides over the top of stack 50 the latch mechanism is triggered so that bed 42 is raised once again.

Referring now to FIGS. 9–12 it has been found efficient to provide a timing wheel to control the motions of the machine in a manner that is coordinated with the discharge of each bale from the drop table. Since the bales are desired to be dropped into six bale stacks, it is desirable to have a timing wheel 56 with six separate positions. Each of these six positions corresponds to the position of the timing wheel for each of the six bales of the stack. In accordance with a preferred embodiment of the machine the timing wheel 56 is rotatably mounted on the right side of the machine 14 when viewed from the rear. However other locations for mounting such a device will be apparent to those skilled in the art.

Figure 9:
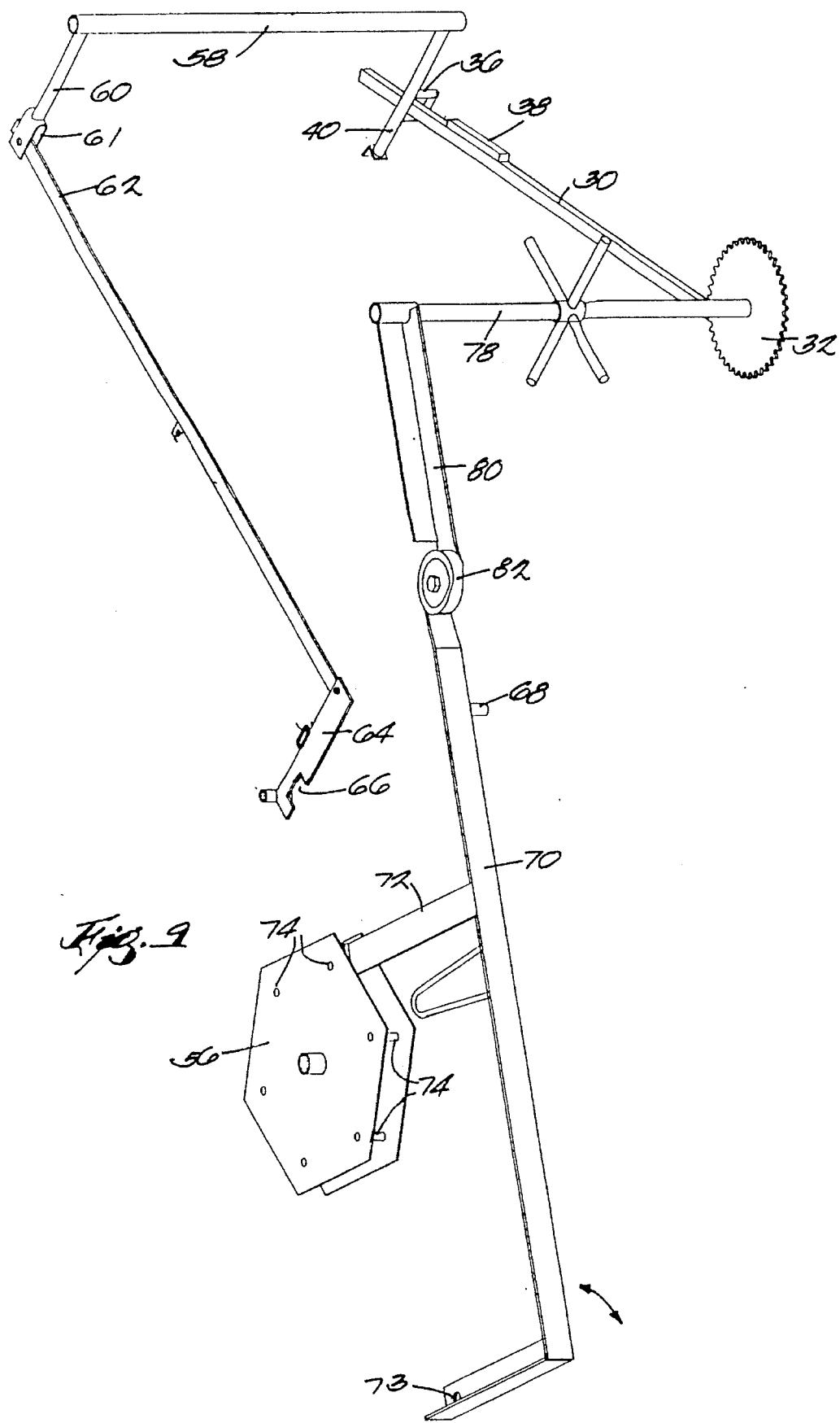
FIG. 9 is a perspective view of the mechanism connecting the timing wheel of the bale stacker device with the drop table trip mechanism.

Referring to FIG. 9, it is seen that the motion imparted to loop 36 by cam 38 also causes movement of a linkage system, as illustrated, as well. The linkage system includes a cross member 58 which is attached, at the opposite end from vertical member 40, to a vertical member 60 having a clevice 61 which is pivotally mounted to a rod 62 that in turn has at its opposite end a plate 64 which is provided with a latching notch 66. Notch 66 is adapted to engage a shaft 68 on a bar 70 that is rockably mounted on the machine and provided with an arm 72 which engages a series of circumferentially arranged pins 74 provided in timing wheel 56. Arm 72 is pivotally attached to frame 22 at a pivot point 73 on its end which, in the preferred embodiment, is L-shaped as shown.

Figure 11:
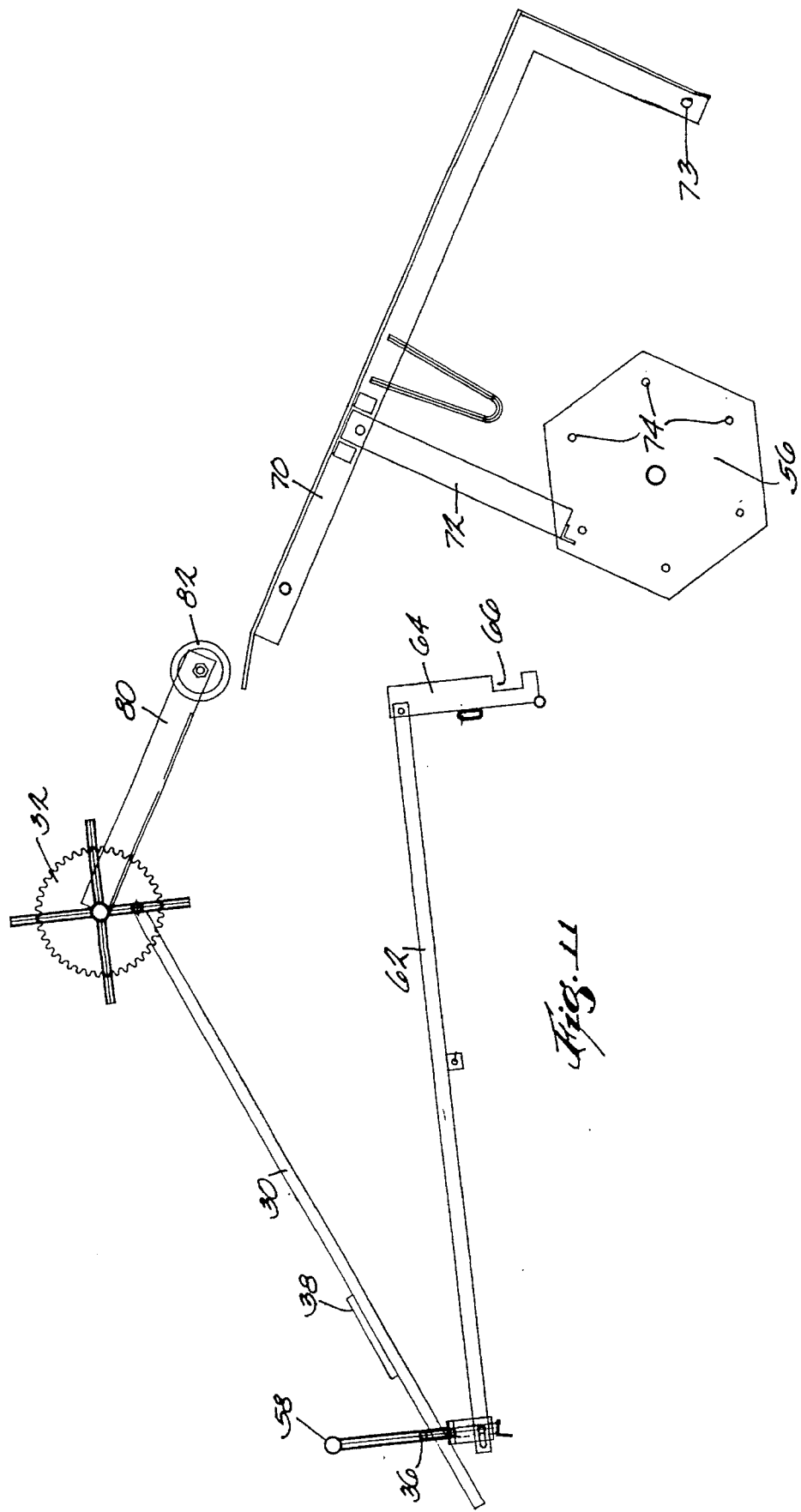
FIG. 11 is a side view showing the mechanism of FIG. 9 in the unlatched position.
Figure 12:
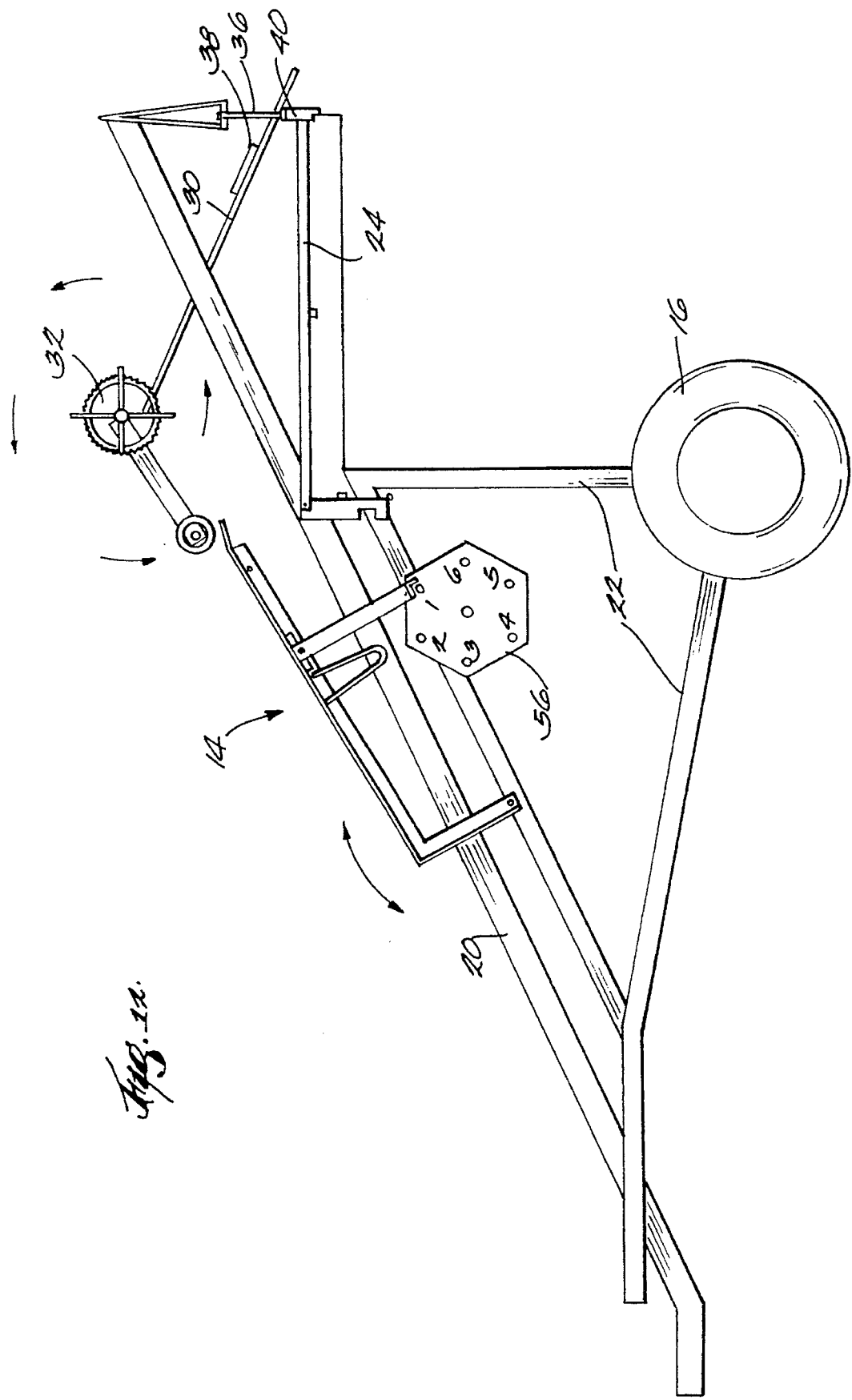
FIG. 12 is a side view of a machine of this invention with parts broken away to show the relationship of the subassembly shown in FIGS. 9–11 with the rest of the machine.

When arm 30 is raised by each successive bale 21 so that cam 38 pushes loop 36, rod 58 is also moved so that movement of arm 62 occurs allowing shaft 68 to become unlatched from slot 66. This allows the arm 70 and connected arm 72 to raise and engage the next successive pin 74 on timing wheel 56 as seen in FIG. 9 and 11.

Figure 10:
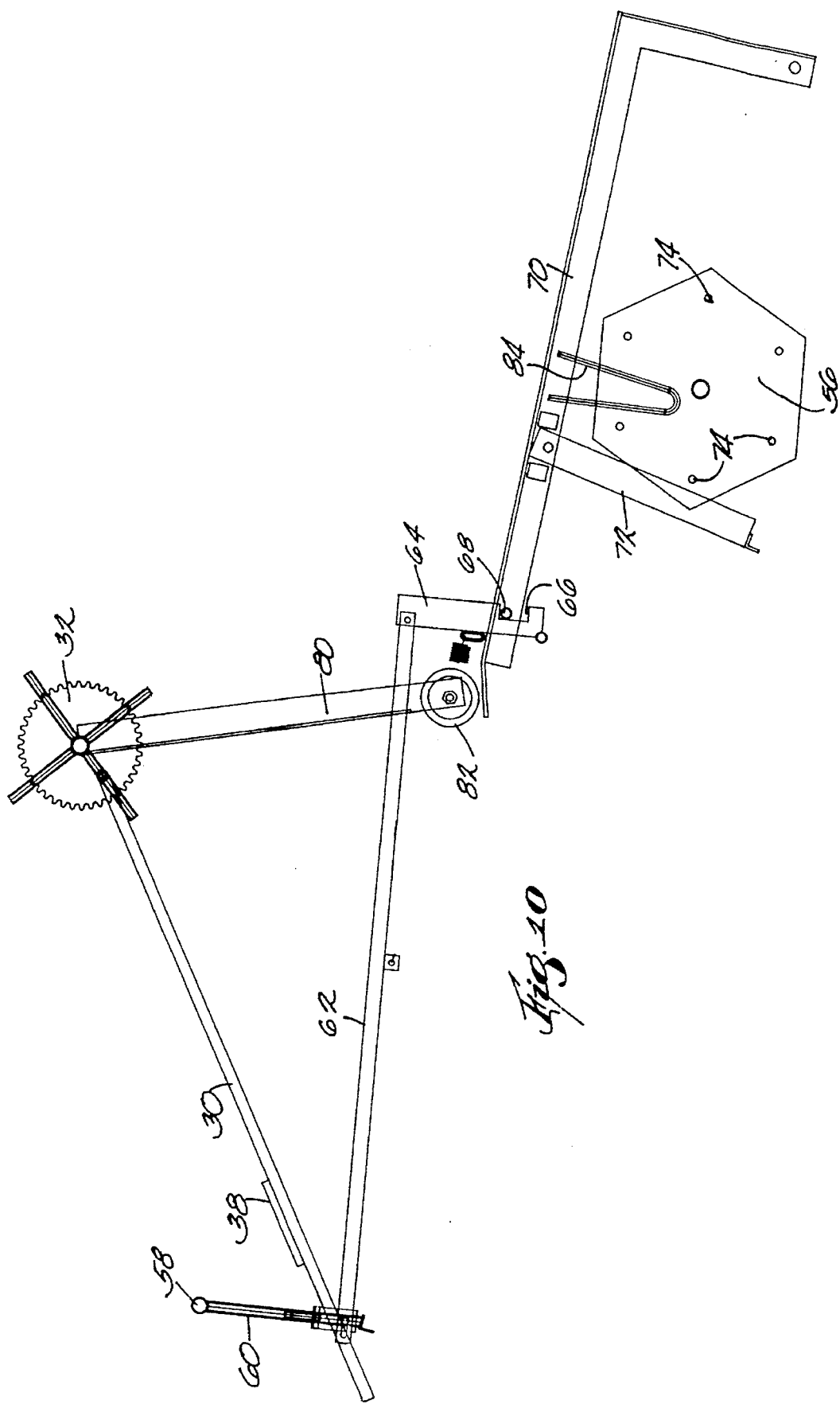
FIG. 10 is a side view showing the mechanism of FIG. 9 in the latched position.

A shaft 78 is integral with wheel 32. An arm 80 is integral with the end of shaft 78 opposite from wheel 32. Arm 80 is preferably provided at its free end with a wheel 82 which is adapted to engage the end of arm 70 with each revolution. As arm 80 revolves, and if arm 70 is in the unlatched position seen in FIG. 9, then the rotation of wheel 32 and arm 80 causes arm 80 to push downwardly on arm 70 thereby causing connected arm 72 to push one of the shafts 74 to advance wheel 56 one position. The downward movement of arm 70 caused by downward pushing of arm 80 also causes pin 68 to be recaptured in slot 66 as best seen in FIG. 10. The pin 68 remains captured within slot 66 until another bale 21 once again raises arm 30. Preferably a loop 84 is provided on arm 70 to prevent rotation of timing wheel 56 when the mechanism is in the latched position. Loop 84 thus prevents the mechanism from becoming out of time.

In operation, as each successive hay bale 21 exits the baler 10 directly onto chute 20, each succeeding bale pushes the bale in front of it. Because the baler and stacker machine 14 hinge to facilitate turning, a funnel begins the chute 20 in known fashion. Thus the bale plunger of baler 10 provides the power to move the bales up chute 20 to the drop table 24. In accordance with the foregoing description each successive bale trips both the drop table and the movement of timing wheel 56 as previously described. As the bales drop they need space to execute a 90° rotation. Thus in a preferred embodiment the width of drop table 24 is 20" in order to accommodate a standard 14"×18" bale, but there needs to be a 23" wide space in the drop area in order to enable the bales to rotate as they fall.

As the timing wheel 56 is thus rotated as the first bale out of a six bale stack is caused to fall, the movement of the timing wheel 56 also causes, through appropriate linkage, panel 46 to drop to the right. This provides space for the second and third bales which follow. After the first three slots are full, the movement of the timing wheel 56 causes divider panel 48 also to fall to the right together with the first three bales. The correct stacking angle and space for the final three bales is then provided. Dropping and collecting of the final three bales completes the pyramidal or "tepee" shaped stack which is then ready to exit the stacking machine as the timing wheel is in its sixth and final position. The movement of the timing wheel to the sixth position also triggers the release of a latch that allows the rear of supporting bed 42 to fall under the weight of the pyramidal stack of bales so that the bales contact the ground. As this occurs the stack of bales stops and the continuing forward movement of the machine pulls the divider panels and bed 42 loose allowing the stack to remain deposited in an intact condition onto the field. Sensor 54 then rides up and over the stack, thereby activating a linkage restoring the bed 42 to its original starting position, thus competing the cycle.

In practice, appropriate linkages are provided, in accordance with previously known practice, to pull the bed 42 upwardly. A helper spring can also be provided to assist in upward pivoting of the bed 42. An angle iron may be attached to the forward end of the bed for this purpose. A chain or cable can also be utilized to assist in lifting the rear of the bed.

Various additional modifications of the invention will become apparent to those skilled in the art thus the claims should be deemed to be limited not only to their literal scope but to reasonable equivalents thereof.

What is claimed is:

1. In a machine for stacking rectangular hay bales emerging from a hay baler in pyramidal stacks of six bales, said machine being adapted to being towed behind a baler and including a chute for receiving a row of bales from a baler discharge chute, said machine further comprising a pivoting drop table to serially drop and rotate said bales 90° about an axis extending centrally along the longest dimensions of said bales, said table having a horizontal position for successively receiving each of said bales and being pivotable about a pivot axis along one side thereof to a dropped position for discharge of said bales, a supporting bed for receiving said bales into three rows from said pivoting table, said bed being provided with a side panel and a pair of separator panels for separating rows of bales in said stack, said separator panels being tiltable for orienting said bales into a pyramidal stack, said machine being mounted for towing on an axle having a wheel at each end, and said bed being pivotable from a substantially level position wherein said bales are collected, to a rearwardly dropped position for discharge of said bales onto a field in a pyramidal stack, the improvement comprising;

said separator panels being oriented at an oblique angle relative to the line of travel of said machine whereby slippage of said bales from between said panels is facilitated.

2. A machine according to claim 1 wherein said pivoting table is provided with a latch that is tripped to allow the table to drop by an arm that is pivotally attached to said machine at a point near the forward end of the drop table and the rearward end of the arm is pivoted upwardly by each bale pushed onto the drop table.

3. A device according to claim 2 wherein said pivoting arm reciprocates where said machine is in motion and is provided with a projection that engages a surface of an arm thereby moving said arm, said arm being connected to a means for causing the latch to release, the release of said latch allowing said table to drop.

4. A device according to claim 1 wherein at least of one of said separator panels is provided with a non planer lower edge whereby the bale striking said edge is caused to be shifted away from an adjoining bale thereby increasing the space between bales in a stack formed on said bed.

5. A device according to claim 1 wherein said bed is hingedly connected to said machine along a hinge line that is oriented at an oblique angle relative to said axle.

* * * * *